(12) United States Patent
Fang et al.

(10) Patent No.: US 12,216,848 B2
(45) Date of Patent: Feb. 4, 2025

(54) TOUCH CONTROL DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Liang Fang, Hubei (CN); Ding Ding, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/755,500

(22) PCT Filed: Apr. 15, 2022

(86) PCT No.: PCT/CN2022/087059
§ 371 (c)(1),
(2) Date: Oct. 5, 2023

(87) PCT Pub. No.: WO2023/184595
PCT Pub. Date: Oct. 5, 2023

(65) Prior Publication Data
US 2024/0168578 A1    May 23, 2024

(30) Foreign Application Priority Data

Apr. 1, 2022 (CN) .......................... 202210347440.9

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC ............................. G06F 3/0412; G06F 3/0446
See application file for complete search history.

(56) References Cited

U.S. PATENT DOCUMENTS

2020/0103991 A1*  4/2020  Nie ..................... G02F 1/13338
2020/0104000 A1   4/2020  Wang et al.
2022/0069031 A1   3/2022  Yue et al.

FOREIGN PATENT DOCUMENTS

CN    108986672 A    12/2018
CN    113296637 A    8/2021
(Continued)

OTHER PUBLICATIONS

International Search Report in International application No. PCT/CN2022/087059, mailed on Dec. 15, 2022.
(Continued)

*Primary Examiner* — Lisa S Landis
(74) *Attorney, Agent, or Firm* — PV IP PC; Wei Te Chung

(57) ABSTRACT

A touch control display panel and a display device are provided. The display device includes the touch control display panel, the touch control display panel includes a touch control layer, and the touch control layer includes touch electrodes and touch signal lines. Two openings formed between two extending segments in a same extending part on the touch signal lines and corresponding extending segments on adjacent touch signal lines are staggered from each other, so a patterning difference between the touch signal lines can be reduced, thereby improving uneven display of the touch control display panel.

20 Claims, 10 Drawing Sheets

(56) References Cited

FOREIGN PATENT DOCUMENTS

| CN | 113325970 | A |   | 8/2021  |            |
|----|-----------|---|---|---------|------------|
| CN | 113485587 | A | * | 10/2021 | G06F 3/0412 |
| CN | 114237424 | A |   | 3/2022  |            |
| WO | 2022011742 | A1 |  | 1/2022  |            |

OTHER PUBLICATIONS

Written Opinion of the International Search Authority in International application No. PCT/CN2022/087059, mailed on Dec. 15, 2022.
Chinese Office Action issued in corresponding Chinese Patent Application No. 202210347440.9 dated Jun. 29, 2024, pp. 1-7.

* cited by examiner

TOUCH CONTROL DISPLAY PANEL AND DISPLAY DEVICE

FIELD OF INVENTION

The present disclosure relates to the field of display technologies, and more particularly, to a touch control display panel and a display device.

BACKGROUND OF INVENTION

With rapid development of display technologies, touch display technologies have gradually spread throughout people's lives. In current touch control display panels, compared to resistive touch control display panels, capacitive touch control display panels have advantages of long service life, high light transmittance, and abilities to support multi-touch, and have become a hot spot of the touch display technologies.

Technical problem: the capacitive touch control display panels may be divided into self-capacitive touch control display panels and mutual-capacitive touch control display panels. At present, in the self-capacitive touch control display panels, a method of disposing wirings includes disposing a metal mesh structure on a same layer as electrodes, and then interrupting the metal mesh structure laterally and longitudinally to form lateral wirings and vertical wirings. Each wiring is electrically connected to each electrode. However, the method of interrupting the metal mesh structure in the related art is too simple, resulting in a significant pattern difference between the formed lateral wirings and vertical wirings. For example, when light is transmitted through separating lines formed during the interrupting process, a vertical separating line is a vertical line, and a horizontal separating line is a horizontal line, so a difference in display brightness between the two separating lines is obvious, thereby easily causing uneven display.

In summary, current touch control display panels have a problem of uneven display caused by the horizontal and vertical pattern distribution of touch signal lines. Therefore, it is necessary to provide a touch control display panel and a display device to improve this defect.

SUMMARY OF INVENTION

The embodiments of the present disclosure provide a touch control display panel and a display device to solve the problem of uneven display caused by the horizontal and vertical pattern distribution of touch signal lines in current display panels.

An embodiment of the present disclosure provides a touch control display panel, which has a display area and a bonding area disposed on one side of the display area and includes:
  a display layer including a plurality of sub-pixels disposed in the display area; and
  a touch control layer disposed on one side of the display layer and including:
  a plurality of touch electrodes disposed in the display area, wherein, the touch electrodes are arranged in rows along a first direction and arranged in columns along a second direction, and the first direction is different from the second direction; and
  a plurality of touch signal lines correspondingly connected to the touch electrodes by one-to-one and extending to the bonding area;
  wherein, each of the touch signal lines includes a main part disposed along the first direction and/or the second direction and positioned on one side of the sub-pixels and a plurality of extending parts spaced apart from each other and extending toward an adjacent touch signal line, and one of the sub-pixels is disposed between two adjacent extending parts of a same touch signal line; and
  each of the extending parts includes two extending segments having different lengths, one of the two extending segments and a corresponding extending segment on the adjacent touch signal line are arranged side by side and spaced apart to form a first opening, another one of the two extending segments and another corresponding extending segment on the adjacent touch signal line are arranged side by side and spaced apart to form a second opening, and the first opening and the second opening are staggered from each other.

According to an embodiment of the present disclosure, in a same extending part, a length of each of the two extending segments is different from a length of respective corresponding extending segments on the adjacent touch signal line disposed on an opposite side of the sub-pixels.

According to an embodiment of the present disclosure, a length of the one of the two extending segments is greater than a length of the corresponding extending segment on the adjacent touch signal line disposed on the opposite side of the sub-pixels, and a length of the another one of the two extending segments is less than a length of the another corresponding extending segment on the adjacent touch signal line disposed on the opposite side of the sub-pixels.

According to an embodiment of the present disclosure, a length of the first opening is equal to a length of the second opening.

According to an embodiment of the present disclosure, widths of the two extending segments of each of the extending parts are equal, and a width of each of the two extending segments is equal to a width of respective corresponding extending segments on the adjacent touch signal line disposed on the opposite side of the sub-pixels.

According to an embodiment of the present disclosure, the main part of each of the touch signal lines includes:
  a first main part including a plurality of first trunks extending along the second direction and disposed on the side of the sub-pixels and a plurality of first connecting parts, wherein, each of the first connecting parts is connected between two adjacent first trunks; and
  a second main part electrically connected to the first main part, wherein, the second main part includes a plurality of second trunks extending along the first direction and disposed on the side of the sub-pixels and a plurality of second connecting parts, and each of the second connecting parts is connected between two adjacent second trunks;
  the extending parts include:
  a plurality of first extending parts, wherein, each of the first extending parts includes a first extending segment and a second extending segment having different lengths and extending from a same first connecting part along the first direction; and
  a plurality of second extending parts, wherein, each of the second extending parts includes a third extending segment and a fourth extending segment having different lengths and extending from a same second connecting part along the second direction.

According to an embodiment of the present disclosure, in each of the first extending parts on the same touch signal line, each first extending segment is disposed on a same side of each second extending segment; and in each of the second extending parts on the same touch signal line, each third extending segment is disposed on a same side of each fourth extending segment.

According to an embodiment of the present disclosure, two adjacent first connecting parts and the first extending parts connected to the two adjacent first connecting parts are symmetrical about a perpendicular bisecting line of a first trunk connected between the two adjacent first connecting parts.

According to an embodiment of the present disclosure, two adjacent second connecting parts and the second extending parts connected to the two adjacent second connecting parts are symmetrical about a perpendicular bisecting line of a second trunk connected between the two adjacent second connecting parts.

According to an embodiment of the present disclosure, at least a part of the touch signal lines are symmetrical about an angle bisecting line of an included angle formed by an extending line of the first trunks and an extending line of the second trunks of the same touch signal line.

According to an embodiment of the present disclosure, at least the part of the touch signal lines each further includes a third connecting part connected between one of the first trunks and one of the second trunks; and the third connecting part is connected with a first extending part and a second extending part, and the first extending part and the second extending part are symmetrical about the angle bisecting line of the included angle formed by the extending line of the first trunks and the extending line of the second trunks.

According to an embodiment of the present disclosure, each of the touch electrodes includes a plurality of touch main parts extending along the second direction and disposed on the side of the sub-pixels and a plurality of touch extending parts extending from the touch main parts and spaced apart from each other, and the touch main parts are electrically connected to each other; and wherein, each of the touch extending parts includes two touch extending segments having different lengths, and one of the touch extending parts and a corresponding touch extending part on an adjacent touch main part are arranged side by side and spaced apart to form two staggered openings, and/or the one of the touch extending parts and a corresponding extending part on the adjacent touch signal line are arranged side by side and spaced apart to form the two staggered openings.

According to an embodiment of the present disclosure, the touch control layer further includes a plurality of virtual lines, the virtual lines are insulated from the touch electrodes and the touch signal lines, and the virtual lines include a plurality of virtual-line main parts extending along the first direction or the second direction and a plurality of virtual-line extending parts extending from the virtual-line main parts and spaced apart from each other; and wherein, each of the virtual-line extending parts includes two virtual-line extending segments having different lengths, and one of the virtual-line extending parts and a corresponding virtual-line extending part on an adjacent virtual line are arranged side by side and spaced apart to form two staggered openings; and/or the one of the virtual-line extending parts and the corresponding extending part on the adjacent touch signal line are arranged side by side and spaced apart to form the two staggered openings; and/or the one of the virtual-line extending parts and the corresponding touch extending part on the adjacent touch main part are arranged side by side and spaced apart to form the two staggered openings.

Based on the touch control display panel, an embodiment of the present disclosure further provides a display device, which includes a case and a touch control display panel installed on the case, wherein, the touch control display panel has a display area and a bonding area disposed on one side of the display area and includes:

a display layer including a plurality of sub-pixels disposed in the display area; and a touch control layer disposed on one side of the display layer and including:

a plurality of touch electrodes disposed in the display area, wherein, the touch electrodes are arranged in rows along a first direction and arranged in columns along a second direction, and the first direction is different from the second direction; and a plurality of touch signal lines correspondingly connected to the touch electrodes by one-to-one and extending to the bonding area;

wherein, each of the touch signal lines includes a main part disposed along the first direction and/or the second direction and positioned on one side of the sub-pixels and a plurality of extending parts spaced apart from each other and extending toward an adjacent touch signal line, and one of the sub-pixels is disposed between two adjacent extending parts of a same touch signal line; and each of the extending parts includes two extending segments having different lengths, one of the two extending segments and a corresponding extending segment on the adjacent touch signal line are arranged side by side and spaced apart to form a first opening, another one of the two extending segments and another corresponding extending segment on the adjacent touch signal line are arranged side by side and spaced apart to form a second opening, and the first opening and the second opening are staggered from each other.

According to an embodiment of the present disclosure, in a same extending part, a length of each of the two extending segments is different from a length of respective corresponding extending segments on the adjacent touch signal line disposed on an opposite side of the sub-pixels.

According to an embodiment of the present disclosure, a length of the one of the two extending segments is greater than a length of the corresponding extending segment on the adjacent touch signal line disposed on the opposite side of the sub-pixels, and a length of the another one of the two extending segments is less than a length of the another corresponding extending segment on the adjacent touch signal line disposed on the opposite side of the sub-pixels.

According to an embodiment of the present disclosure, a length of the first opening is equal to a length of the second opening.

According to an embodiment of the present disclosure, widths of the two extending segments of each of the extending parts are equal, and a width of each of the two extending segments is equal to a width of respective corresponding extending segments on the adjacent touch signal line disposed on the opposite side of the sub-pixels.

According to an embodiment of the present disclosure, the main part of each of the touch signal lines includes:

a first main part including a plurality of first trunks extending along the second direction and disposed on the side of the sub-pixels and a plurality of first connecting parts, wherein, each of the first connecting parts is connected between two adjacent first trunks; and a second main part electrically connected to the first main part, wherein, the second main part includes a plurality of second trunks extending along the first direction and disposed on the side of the sub-pixels and a plurality of second connecting parts, and each of the second connecting parts is connected between two adjacent second trunks;

the extending parts include:

a plurality of first extending parts, wherein, each of the first extending parts includes a first extending segment and a second extending segment having different lengths and extending from a same first connecting part along the first direction; and a plurality of second extending parts, wherein, each of the second extending parts includes a third extending segment and a fourth extending segment having different lengths and extending from a same second connecting part along the second direction.

According to an embodiment of the present disclosure, in each of the first extending parts on the same touch signal line, each first extending segment is disposed on a same side of each second extending segment; and in each of the second extending parts on the same touch signal line, each third extending segment is disposed on a same side of each fourth extending segment.

Beneficial effect: the beneficial effect of the embodiments of the present disclosure: the embodiment of the present disclosure provides the touch control display panel. The touch control display panel has the display area and the bonding area disposed on one side of the display area and includes: the display layer including the plurality of sub-pixels disposed in the display area; and a touch control layer including the plurality of touch electrodes disposed in the display area, wherein, the touch electrodes are arranged in rows along the first direction and arranged in columns along the second direction, and the first direction is different from the second direction; and the plurality of touch signal lines correspondingly connected to the touch electrodes by one-to-one and extending to the bonding area, wherein, a part of the sub-pixels are disposed between two adjacent touch signal lines; wherein, each of the touch signal lines includes the main part and the plurality of extending parts spaced apart from each other and extending toward an adjacent touch signal line, and one of the sub-pixels is disposed between two adjacent extending parts; and each of the extending parts includes two extending segments having different lengths, one of the two extending segments and a corresponding extending segment on the adjacent touch signal line are arranged side by side and spaced apart to form the first opening, and another one of the two extending segments and another corresponding extending segment on the adjacent touch signal line are arranged side by side and spaced apart to form the second opening. By staggering the first opening and the second opening, a patterning difference of the touch signal lines arranged respectively along the first direction and the second direction can be reduced, thereby reducing a difference of light transmittance between the touch signal lines arranged along the first direction and the second direction during display. Therefore, uneven display of the touch control display panel can be improved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
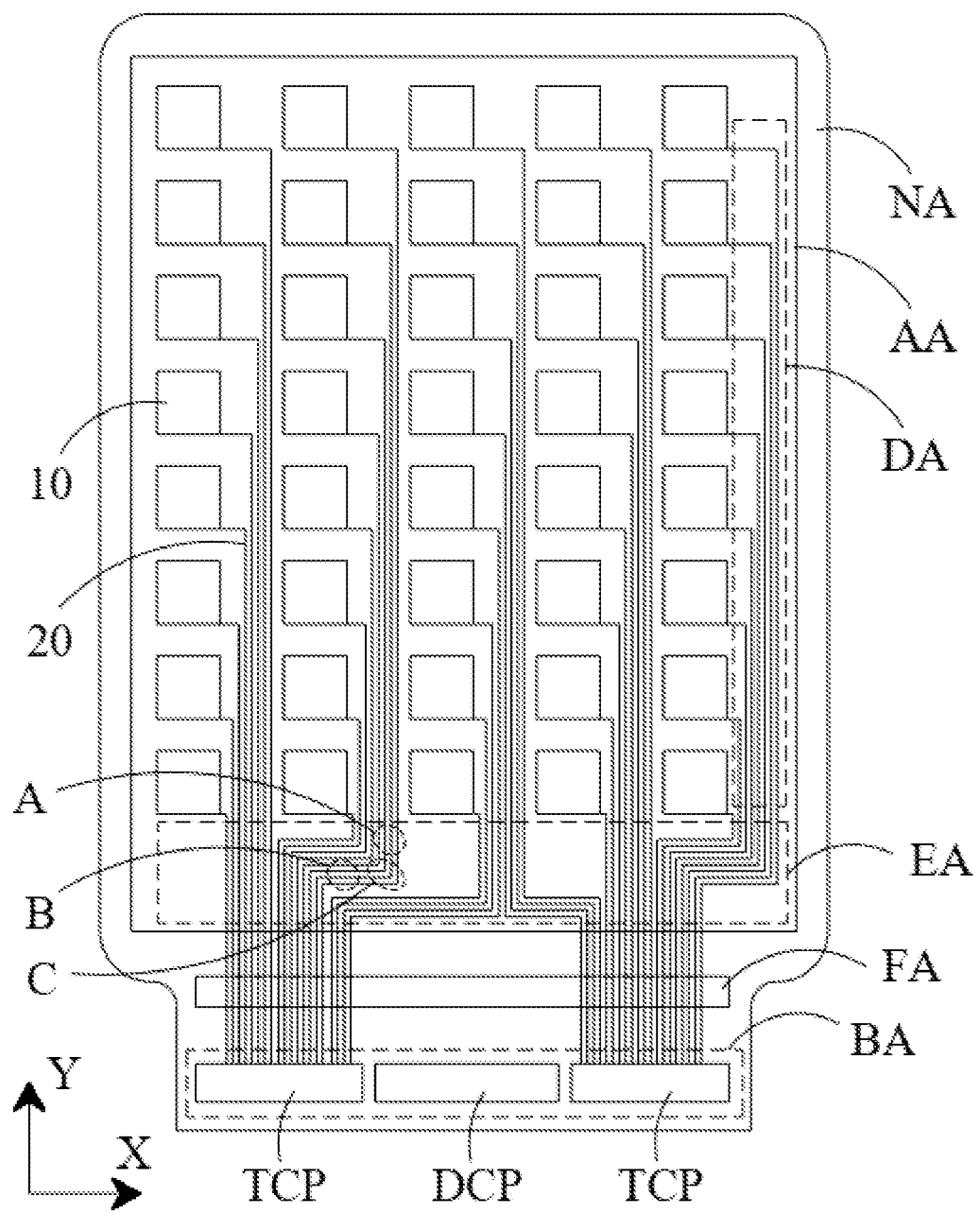
FIG. 1 is a schematic planar structural diagram of a touch control display panel according to an embodiment of the present disclosure.

The specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. Therefore, the directional terms used are to illustrate and understand the present disclosure, not to limit the present disclosure. The identical or similar reference numerals constantly denote the identical or similar elements or elements having the identical or similar functions in the drawings.

The present disclosure will be further explained below in conjunction with the drawings and specific embodiments.

An embodiment of the present disclosure provides a touch control display panel. As shown in FIG. 1, FIG. 1 is a schematic planar structural diagram of the touch control display panel according to an embodiment of the present disclosure. The touch control display panel includes a display area AA and a non-display area NA disposed surrounding the display area AA. The non-display area NA includes a bonding area BA and a bending area FA, the bonding area BA is disposed on one side of the display area AA, and the bending area FA is disposed between the display area AA and the bonding area BA.

The touch control display panel includes a touch control layer, the touch control layer is disposed on one side of a display layer, the touch control layer includes a plurality of touch electrodes 10, and the touch electrodes 10 are disposed in the display area AA. The touch electrodes 10 are arranged in rows along a first direction X and arranged in columns along a second direction Y, and M*N touch electrodes may be disposed in the display area AA of the touch control display panel. Wherein, M and N respectively represent a number of the touch electrodes 10 in row and column directions, and both M and N are positive integers.

In the embodiments of the present disclosure, as shown in FIG. 1, M is 8, N is 5, and eight rows and five columns of touch electrodes may be disposed in the display area AA of the touch control display panel. In practical applications, the number of the touch electrodes disposed in the display area AA of the touch control display panel may be set according to a size of the display area AA and a size of the touch electrodes, and is not limited herein.

The touch control layer further includes a plurality of touch signal lines 20, which are correspondingly connected to the touch electrodes 10 by one-to-one and extend to the bonding area BA.

In the embodiments of the present disclosure, the touch control display panel is a self-capacitive touch control display panel, and a touch control function is realized by a metal layer. The touch signal lines 20 are disposed on a same layer as the touch electrodes 10, each of the touch signal lines 20 is connected to a corresponding one of the touch electrodes 10, and the touch signal lines 20 are made of the same material as the touch electrodes 10. In an actual manufacturing process, a metal layer may be deposited and formed first, and then a same etching process is used to form the touch electrodes 10 and the touch signal lines 20 at a same time.

A plurality of touch connection pads TCP may be disposed in the bonding area BA, one end of each of the touch signal lines 20 is connected to a corresponding touch electrode 10, and another end of each of the touch signal lines 20 extends from the display area AA to the bonding area BA and is connected with a corresponding touch connection pad TCP. A plurality of display connection pads DCP may also be disposed in the bonding area, and the display connection pads may be connected to a pixel driving circuit of sub-pixels in the display area AA by data signal lines.

As shown in FIG. 1, The display area AA includes an edge display area EA adjacent to the bending area FA. A part of the touch signal lines 20 may directly extend to the bonding area BA along the second direction Y after led out from the touch electrodes 10. Another part of the touch signal lines 20, after led out from the touch electrodes 10, need to extend to the edge display area EA along the second direction Y first, then is adjusted from extending along the second direction Y to extending along the first direction X in the edge display area EA, and then is adjusted to extending to the bonding area BA along the second direction Y.

Further, each of the touch signal lines 20 includes a main part disposed along the first direction and/or the second direction and positioned on one side of the sub-pixels and a plurality of extending parts spaced apart from each other and extending toward an adjacent touch signal line 20, and one of the sub-pixels is disposed between two adjacent extending parts of a same touch signal line.

Figure 2:
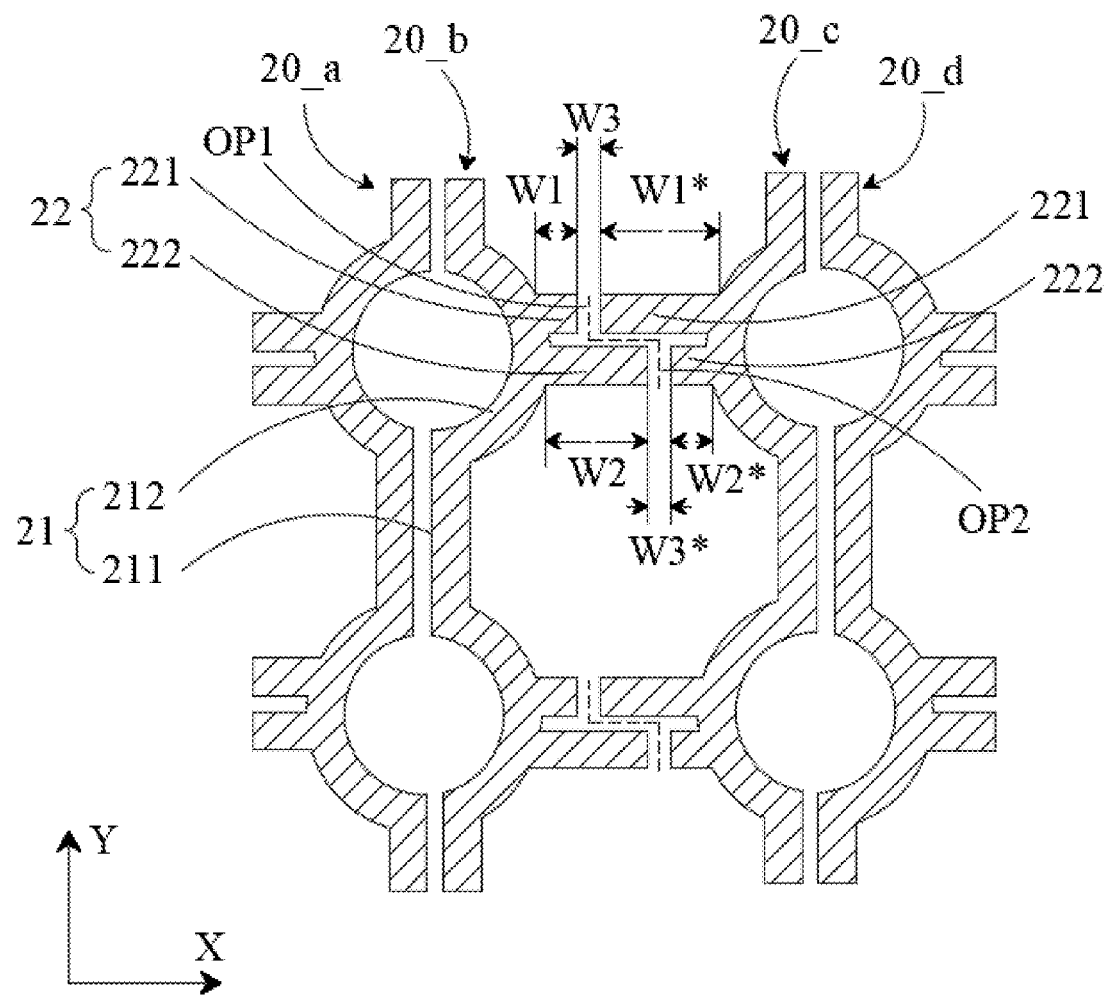
FIG. 2 is a first schematic enlarged diagram of a site A according to an embodiment of the present disclosure.

As shown in FIG. 2, FIG. 2 is a first schematic enlarged diagram of a site A according to an embodiment of the present disclosure. The site A is located in the edge display area EA, and the touch signal lines 20 located at the site A all extend along the second direction Y. FIG. 2 only illustrates four touch signal lines at the site A, which are touch signal lines 20_a, 20_b, 20_c, and 20_d, respectively.

The touch signal line 20_b at the site A is taken as an example. The main part of the touch signal line 20_b includes a first main part 21, and the first main part 21 includes a plurality of first trunks 211 extending along the second direction Y and disposed on one side of the sub-pixels and a plurality of first connecting parts 212, wherein, each of the first connecting parts 212 is connected between two adjacent first trunks 211. The first trunks 211 are straight lines extending along the second direction Y, the first connecting parts 212 are curved, and two ends of each of the first connecting parts 212 are respectively connected to two adjacent first trunks 211.

Further, the extending parts include first extending parts 22, one end of the first extending parts 22 is connected to the first connecting parts 212, and another end of the first extending parts 22 extends toward the adjacent touch signal line 20.

The touch signal lines 20_b and 20_c at the site A are taken as an example, the touch signal line 20_b has a plurality of first extending parts 22 disposed spaced apart from each other, one end of the first extending parts 22 is connected to the first connecting parts 212 of the touch signal line 20_b, and another end of the first extending parts 22 extends toward the adjacent touch signal line 20_c along the first direction X. The touch signal line 20_c also has a plurality of first extending parts 22 disposed spaced apart from each other, the first extending parts 22 of the touch signal line 20_c extend toward the adjacent touch signal line 20_b along the first direction X, and the first extending parts 22 of the touch signal line 20_c and the first extending parts 22 of the touch signal line 20_b are arranged side by side and spaced apart from each other. Structures of other touch signal lines are substantially same as that of the touch signal line 20_b, and are not repeated herein.

Further, each of the first extending parts 22 includes two extending segments, lengths of the two extending segments are different, one end of the two extending segments is connected to a same first connecting part 212, and a second end of the two extending segments extends toward the adjacent touch signal line along the first direction X. One of the two extending segments and a corresponding extending segment on the adjacent touch signal line are arranged side by side and spaced apart to form a first opening OP1, and another one of the two extending segments and another corresponding extending segment on the adjacent touch signal line are arranged side by side and spaced apart to form a second opening OP2. The first opening OP1 and the second opening OP2 are staggered from each other.

The touch signal line 20_b at the site A is taken as an example. Each of the first extending parts 22 of the touch signal line 20_b includes two extending segments, namely, a first extending segment 221 and a second extending segment 222, and a length of the first extending segment 221 is different from that of the second extending segment 222. Each of the first extending parts 22 of the touch signal line 20_c also includes two extending segments, namely, a first extending segment 221 and a second extending segment 222. The first extending segment 221 of the touch signal line 20_b and the first extending segment 221 of the touch signal line 20_c are disposed opposite to each other and spaced apart from each other to form the first opening OP1. The second extending segment 222 of the touch signal line 20_b and the second extending segment 222 of the touch signal line 20_c are disposed opposite to each other and spaced apart from each other to form the second opening OP2. The first opening OP1 and the second opening OP2 are arranged in a staggered manner, so that a zigzag channel is formed between the first extending parts 22 of the touch signal line 20_b and the touch signal line 20_c as shown by the dotted line in FIG. 2.

For the touch signal lines 20 that are directly extended to the bonding area BA along the second direction Y after being drawn from the touch electrodes in FIG. 1, they may only have the first main part 21 shown in FIG. 2 and the first extending parts 22 extending from the first main part 21 toward the adjacent touch signal line, and their structures may refer to the touch signal line 20_b, which will not be iterated herein for the sake of conciseness. For the touch signal lines 20 whose extending direction needs to be changed in the edge display area EA, they may not only have the first main part 21 and the first extending parts 22 but also a second main part 23 and second extending parts 24 extending from the second main part 23.

Figure 3:
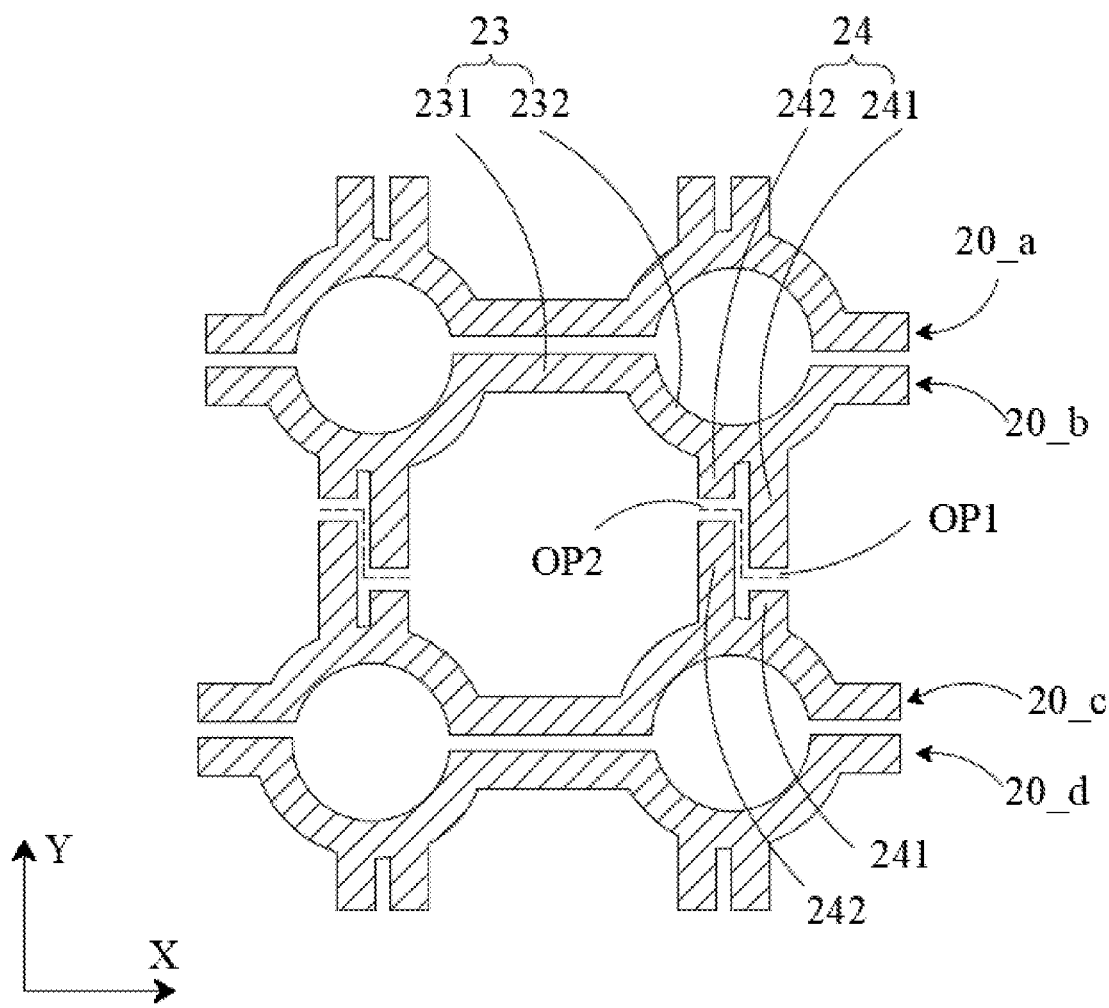
FIG. 3 is a first schematic enlarged diagram of a site B according to an embodiment of the present disclosure.

As shown in FIG. 3, FIG. 3 is a first schematic enlarged diagram of a site B according to an embodiment of the present disclosure. The site B is located in the edge display area, and the touch signal lines located at the site B all extend along the first direction X. The four touch signal lines at the site B shown in FIG. 3 are the four touch signal lines 20_a, 20_b, 20_c, and 20_d at the site A shown in FIG. 2.

The touch signal line 20_b at the site B is taken as an example. The touch signal lines 20 include a second main part 23, the second main part 23 is electrically connected to the first main part 21, and the second main part 23 includes a plurality of second trunks 231 extending along the first direction X and disposed on the side of the sub-pixels and a plurality of second connecting parts 232, wherein, each of the second connecting parts 232 is connected between two adjacent second trunks 231. The second trunks 231 are straight lines extending along the first direction X, the second connecting parts 232 are curved, and two ends of each of the second connecting parts 232 are respectively connected to two adjacent second trunks 231.

The extending parts include the second extending parts 24, one end of the second extending parts 24 is connected to the second connecting parts 232, and another end of the second extending parts 24 extends toward the adjacent touch signal line 20.

The touch signal line 20_b at the site B is taken as an example, the touch signal line 20_b has a plurality of second extending parts 24 disposed spaced apart from each other, one end of the second extending parts 24 is connected to the second connecting parts 232 of the touch signal line 20_b, and another end of the second extending parts 24 extends toward the adjacent touch signal line 20_c along the second direction Y. The touch signal line 20_c also has a plurality of second extending parts 24 disposed spaced apart from each other, the second extending parts 24 of the touch signal line 20_c extend toward the adjacent touch signal line 20_b along the second direction Y, and the second extending parts 24 of the touch signal line 20_c and the second extending parts 24 of the touch signal line 20_b are arranged side by side and spaced apart from each other.

Further, each of the second extending parts 24 includes two extending segments, lengths of the two extending segments are different, one end of the two extending segments is connected to a same second connecting part 232, and a second end of the two extending segments extends toward the adjacent touch signal line along the second direction Y. One of the two extending segments and a corresponding extending segment on the adjacent touch signal line are arranged side by side and spaced apart to form a first opening OP1, and another one of the two extending segments and another corresponding extending segment on the adjacent touch signal line are arranged side by side and spaced apart to form a second opening OP2. The first opening OP1 and the second opening OP2 are staggered from each other.

The touch signal line 20_b at the site B is taken as an example. Each of the second extending parts 24 of the touch signal line 20_b includes two extending segments, namely, a third extending segment 241 and a fourth extending segment 242, and a length of the third extending segment 241 is different from that of the fourth extending segment 242. Each of the second extending parts 24 of the touch signal line 20_c also includes two extending segments, namely, a third extending segment 241 and a fourth extending segment 242. The third extending segment 241 of the touch signal line 20_b and the third extending segment 241 of the touch signal line 20_c are disposed opposite to each other and spaced apart from each other to form the first opening OP1. The fourth extending segment 242 of the touch signal line 20_b and the fourth extending segment 242 of the touch signal line 20_c are disposed opposite to each other and spaced apart from each other to form the second opening OP2. The first opening OP1 and the second opening OP2 are arranged in a staggered manner, so that a zigzag channel is formed between the second extending parts 24 of the touch signal line 20_b and the touch signal line 20_c as shown by the dotted line in FIG. 3.

Figure 4:
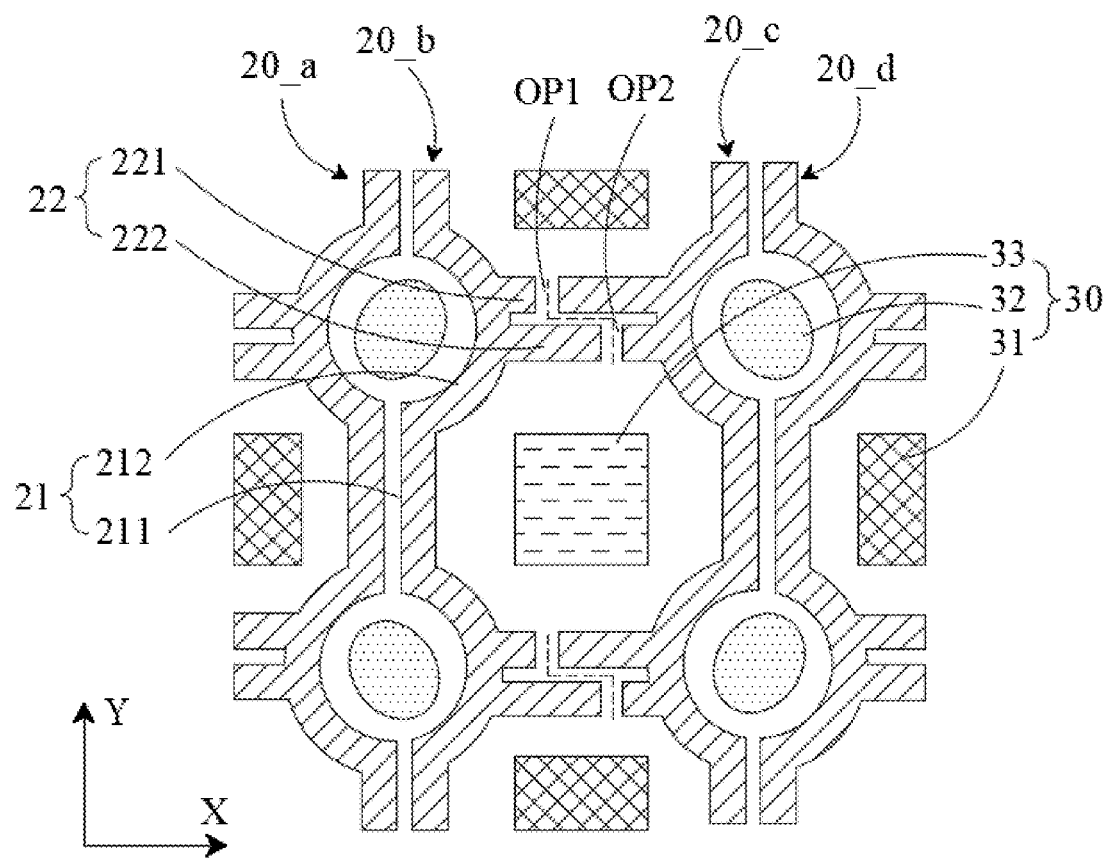
FIG. 4 is a schematic diagram of an arrangement of sub-pixels according to an embodiment of the present disclosure.

As shown in FIG. 4, FIG. 4 is a schematic diagram of an arrangement of the sub-pixels according to an embodiment of the present disclosure. The touch control display panel further includes a display layer, and the display layer includes a plurality of sub-pixels 30 disposed in the display area AA. The sub-pixels 30 may include red sub-pixels 31, green sub-pixels 32, and blue sub-pixels 33. The sub-pixels 30 may be arranged in a preset manner, and the sub-pixels 30 may be arranged between two adjacent columns of the touch signal lines.

As shown in FIG. 4, the first connecting parts 212 on the two adjacent touch signal lines 20 may be enclosed to form a plurality of grids, and the green sub-pixels 32 may be disposed in the grids. The touch signal line 20_a and the touch signal line 20_b are taken as an example. The plurality of first connecting parts 212 on the touch signal line 20_a and the plurality of first connecting parts 212 on the touch signal line 20_b disposed adjacently are arranged around the periphery of the green sub-pixels 32 to form grid shapes surrounding the green sub-pixels 32. Therefore, it can prevent from blocking light emitted from the green sub-pixels 32 under the touch control layer.

Two adjacent touch signal lines 20 may also be arranged around the periphery of the red sub-pixels 31 or the blue sub-pixels 33 to form grids surrounding the red sub-pixels 31 or the blue sub-pixels 33. The touch signal line 20_b and the touch signal line 20_c are taken as an example. Two adjacent first connecting parts 212, a first trunk 211 connected between the two first connecting parts 212, and two first extending parts 22 connected to the two first connecting parts 212 on the touch signal line 20_b together with two adjacent first connecting parts 212, a first trunk 211 connected between the two first connecting parts 212, and two first extending parts 22 connected to the two first connecting parts 212 on the adjacent touch signal line 20_c are enclosed to form a grid surrounding one of the blue sub-pixels 33. Therefore, it can prevent the touch signal lines 20 from blocking light emitted from the blue sub-pixels.

It should be noted that in FIG. 4, only the site A is taken as an example for description, an arrangement of the touch signal lines and the sub-pixels 30 at the site B is substantially the same as that at the site A, and a difference is only that the extending direction of the touch signal lines at the site B is different from that at the site A. The arrangement of the touch signal lines 20 and the sub-pixels 30 at the site B may be referred to the site A, and is not repeated herein.

FIG. 4 is taken as an example for description. If the first opening OP1 and the second opening OP2 are not staggered from each other but on a same straight line, light emitted from the first opening OP1 and light emitted from the second opening OP2 will be concentrated at an intersection of the first opening OP1 and the second opening OP2. Therefore, the brightness at the intersection of the first opening OP1 and the second opening OP2 will be higher than the brightness in areas shielded by surrounding metal layer, and causing the touch control display panel to have uneven brightness. Staggering the first opening OP1 and the second opening OP2 can allow the light emitted from the first opening OP1 and the light emitted from the second opening OP2 to be dispersed from each other, thereby preventing the light from being concentrated at the intersection of the first opening OP1 and the second opening OP2. Therefore, the brightness difference between the first opening OP1 and the areas shielded by the surrounding metal layer and the brightness difference between the second opening OP2 and the areas shielded by the surrounding metal layer can be reduced, thereby improving the uneven brightness of the touch control display panel and further improving display uniformity of the touch control display panel.

Further, in a same extending part, a length of each of the two extending segments is different from a length of their corresponding extending segments on the adjacent touch signal line disposed on an opposite side of the sub-pixels.

As shown in FIG. 2, the touch signal lines 20_b and 20_c at the site A are taken as an example for description. A length W1 of the first extending segment 221 on the touch signal line 20_b is different from a length W1* of the corresponding first extending segment 221 on the touch signal line 20_c, and a length W2 of the second extending segment 222 on the touch signal line 20_b is different from a length W2* of the corresponding second extending segment 222 on the touch signal line 20_c.

In an embodiment, the length W1 of the first extending segment 221 on the touch signal line 20_b is less than the length W2 of the second extending segment 222 on the touch signal line 20_b, the length W1 of the first extending segment 221 on the touch signal line 20_b is less than the length W1* of the corresponding first extending segment 221 on the touch signal line 20_c, and the length W2 of the second extending segment 222 on the touch signal line 20_b is greater than the length W2* of the corresponding second extending segment 222 on the touch signal line 20_c. The first opening OP1 and the second opening OP2 can be staggered from each other by controlling the lengths of the first extending segment 221 and the second extending segment 222 of the first extending parts 22, thereby reducing lengths of vertical or horizontal bright lines formed at the first opening OP1 and the second opening OP2. Therefore, uneven brightness of the touch control display panel caused by a patterning design of horizontal and vertical wirings can be improved.

In an embodiment, the length W1 of the first extending segment 221 on the touch signal line 20_b is equal to the length W2* of the corresponding second extending segment 222 on the touch signal line 20_c, and the length W2 of the second extending segment 222 on the touch signal line 20_b is equal to the length W1* of the corresponding first extending segment 221 on the touch signal line 20_c.

Further, a length of the first opening OP1 is equal to a length of the second opening OP2.

The touch signal lines 20_b and 20_c at the site A are taken as an example for description. The length of the first opening OP1 is W3, the length of the second opening OP2 is W3*, and the length W3 of the first opening OP1 is equal to the length W3* of the second opening OP2. For the site B, lengths of the first opening OP1 and the second opening OP2 formed between the second extending parts 24 of two adjacent touch signal lines 20 extending along the first direction X are also equal. Therefore, the differences between first openings OP1 and second openings OP2 at different sites observed from various angles can be reduced, thereby improving the uneven brightness of the touch control display panel.

Further, widths of the two extending segments of each of the extending parts are equal, and a width of each of the two extending segments is equal to a width of their corresponding extending segments on the adjacent touch signal line disposed on the opposite side of the sub-pixels.

As shown in FIG. 2, the touch signal lines 20_b and 20_c at the site A are taken as an example for description. The widths of the first extending segment 221 and the second extending segment 222 of the first extending parts 22 on the touch signal line 20_b are equal, and the widths of the first extending segment 221 and the second extending segment 222 of the first extending parts 22 on the touch signal line 20_c are also equal. The width of the first extending segment 221 on the ouch signal line 20_b is equal to that of the corresponding first extending segment 221 on the touch signal line 20_c, and the width of the second extending segment 222 on the touch signal line 20_b is equal to that of the corresponding second extending segment 222 on the touch signal line 20_c. In this way, a difficulty of process monitoring can be reduced, and the differences between the first openings OP1 and the second openings OP2 observed from various angles can be reduced, thereby improving the uneven brightness of the touch control display panel.

It should be noted that in the above embodiments, only the structures of the first extending parts 22 of the touch signal lines at the site A in FIG. 1 are taken as an example for description. Structures of the second extending parts 24 of the touch signal lines at the site B in FIG. 1, a length relationship between the third extending segment and the fourth extending segment of the second extending parts 24, a length relationship between the third extending segment and a corresponding third extending segment on the adjacent touch signal line, and a length relationship between the fourth extending segment and a corresponding fourth extending segment on the adjacent touch signal lines can be set with reference to the structures of the first extending parts 22 at the site A in the above embodiments, and are not repeated herein.

Further, in each of the first extending parts on the same touch signal line, each first extending segment is disposed on a same side of each second extending segment; and in each of the second extending parts on the same touch signal line, each third extending segment is disposed on a same side of each fourth extending segment.

As shown in FIG. 4, the touch signal line 20_b is taken as an example. The first extending segment 221 of any one of the first extending parts 22 on the touch signal line 20_b is disposed above the second extending segment 222 of the first extending parts 22. In other embodiments, the first extending segment 221 may also be disposed below the second extending segment 222.

As shown in FIG. 3, the touch signal line 20_b is taken as an example. The third extending segment 241 of any one of the second extending parts 24 on the touch signal line 20_b is disposed on a right side of the fourth extending segment 242 of the second extending parts 24. In other embodiments, the third extending segment 241 may also be disposed on a left side of the fourth extending segment 242.

In an embodiment, two adjacent first connecting parts and the first extending parts connected to the two adjacent first connecting parts are symmetrical about a perpendicular bisecting line of a first trunk connected between the two adjacent first connecting parts.

Figure 5:
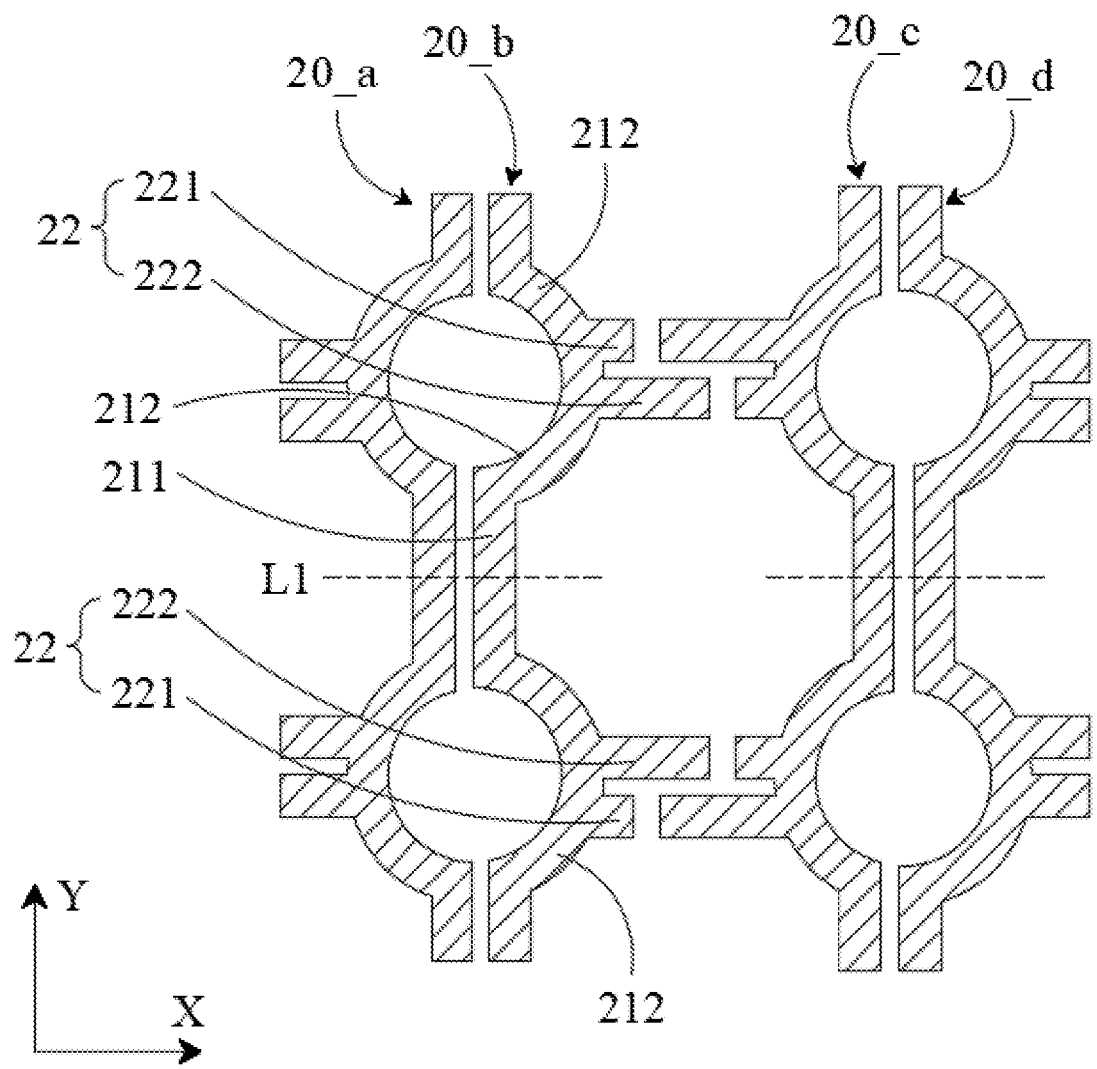
FIG. 5 is a second schematic enlarged diagram of the site A according to an embodiment of the present disclosure.

As shown in FIG. 5, FIG. 5 is a second schematic enlarged diagram of the site A according to an embodiment of the present disclosure. It should be noted that a second structure of the touch signal lines shown in FIG. 5 is substantially same as the first structure of the touch signal lines shown in FIG. 2. A difference is that in the second structure of the touch signal lines shown in FIG. 5, the two adjacent first connecting parts and the first extending parts connected to the two adjacent first connecting parts are symmetrical about the perpendicular bisecting line of the first trunk connected between the two adjacent first connecting parts.

The touch signal lines 20_b and 20_c in FIG. 5 are taken as an example for description. The perpendicular bisecting line of one of the first trunks 211 on the touch signal line 20_b is L1, and the perpendicular bisecting line L1 of the first trunk 211 is parallel to the first direction X.

As shown in FIG. 5, the two first connecting parts 212 connected to the first trunk 211 are symmetrical about the perpendicular bisecting line L1 of the first trunk 211, and a first set of the first extending parts 22 connected to a first first connecting part 212 and a second set of the first extending parts 22 connected to a second first connecting part 212 are symmetrical about the perpendicular bisecting line L1 of the first trunk 211. Wherein, the first extending segment 221 in the first set of the first extending parts 22 and the first extending segment 221 in the second set of the first extending parts 22 are symmetrical about the perpendicular bisecting line L1, and the second extending segment 222 in the first set of the first extending parts 22 and the second extending segment 222 in the second set of the first extending parts 22 are symmetrical about the perpendicular bisecting line L1.

A symmetrical structure of the touch signal line 20_c may refer to the touch signal line 20_b, and is not repeated herein. Thus, peripheral touch signal lines of the blue sub-pixels 33 or the red sub-pixels 31 surrounded by the touch signal lines 20_b and 20_c can be distributed symmetrically, thereby reducing a difference of large viewing angles caused by an asymmetrical design.

Further, two adjacent second connecting parts and the second extending parts connected to the two adjacent second connecting parts are symmetrical about a perpendicular bisecting line of a second trunk connected between the two adjacent second connecting parts.

Figure 6:
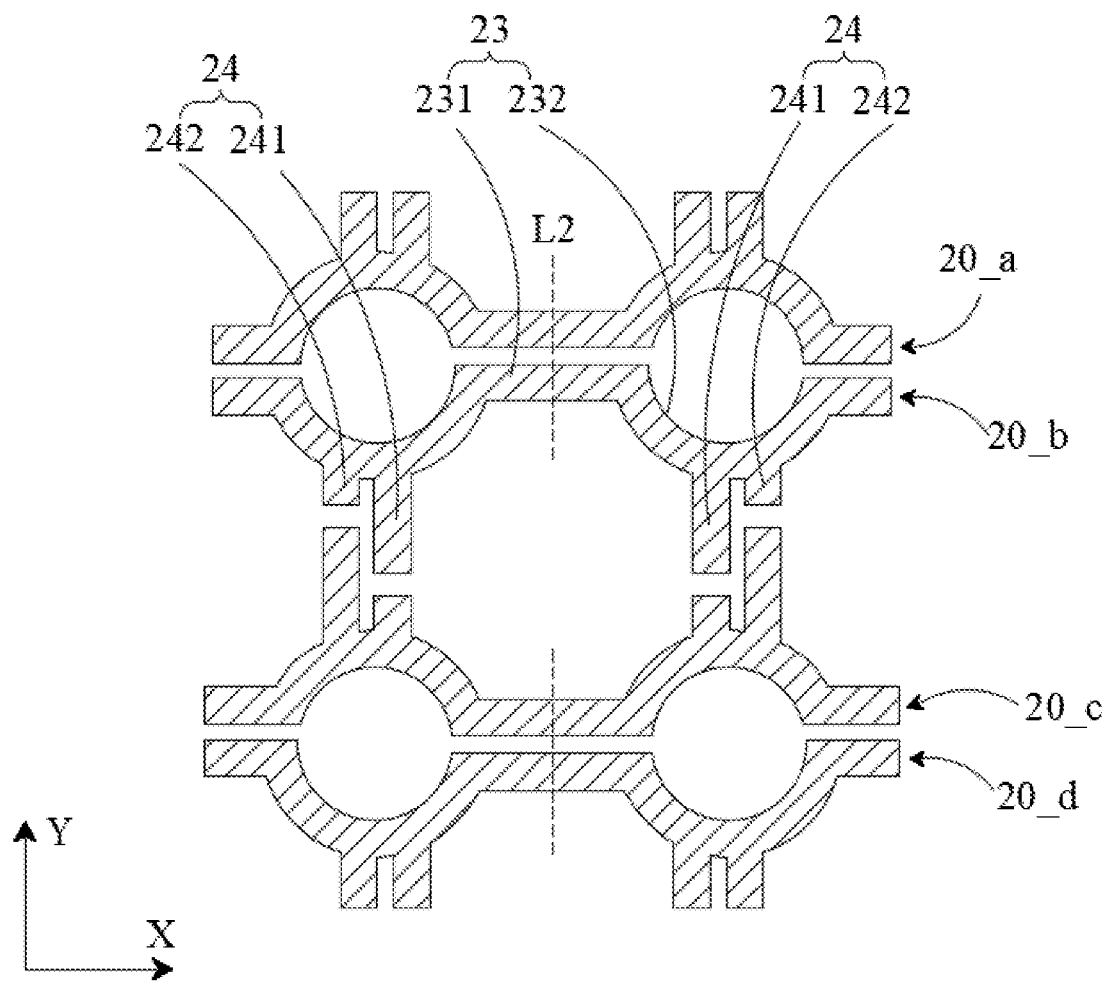
FIG. 6 is a second schematic enlarged diagram of the site B according to an embodiment of the present disclosure.

As shown in FIG. 6, FIG. 6 is a second schematic enlarged diagram of the site B according to an embodiment of the present disclosure. It should be noted that a second structure of the touch signal lines shown in FIG. 6 is substantially same as the first structure of the touch signal lines shown in FIG. 3. A difference is that in the second structure of the touch signal lines shown in FIG. 6, the two adjacent second connecting parts and the second extending parts connected to the two adjacent second connecting parts are symmetrical about the perpendicular bisecting line of the second trunk connected between the two adjacent second connecting parts.

The touch signal lines 20_b and 20_c in FIG. 6 are taken as an example for description. The perpendicular bisecting line of one of the second trunks 231 on the touch signal line 20_b is L2, and the perpendicular bisecting line L2 of the second trunk 231 is parallel to the second direction Y.

As shown in FIG. 6, the two second connecting parts 232 connected to the second trunk 231 are symmetrical about the perpendicular bisecting line L2 of the second trunk 231, and a first set of the second extending parts 24 connected to a first second connecting part 232 and a second set of the second extending parts 24 connected to a second second connecting part 232 are symmetrical about the perpendicular bisecting line L2 of the second trunk 231. Wherein, the third extending segment 241 in the first set of the second extending parts 24 and the third extending segment 241 in the second set of the second extending parts 24 are symmetrical about the perpendicular bisecting line L2, and the fourth extending segment 242 in the first set of the second extending parts 24 and the fourth extending segment 242 in the second set of the second extending parts 24 are symmetrical about the perpendicular bisecting line L2.

A symmetrical structure of the touch signal line 20_c extending along the first direction X may refer to the touch signal line 20_b, and is not repeated herein. Thus, the peripheral touch signal lines of the blue sub-pixels 33 or the red sub-pixels 31 surrounded by the touch signal lines 20_b and 20_c can be distributed symmetrically, thereby reducing the difference of large viewing angles caused by the asymmetrical design.

Further, at least a part of the touch signal lines are symmetrical about an angle bisecting line of an included angle formed by an extending line of the first trunks and an extending line of the second trunks of the same touch signal line.

Figure 7:
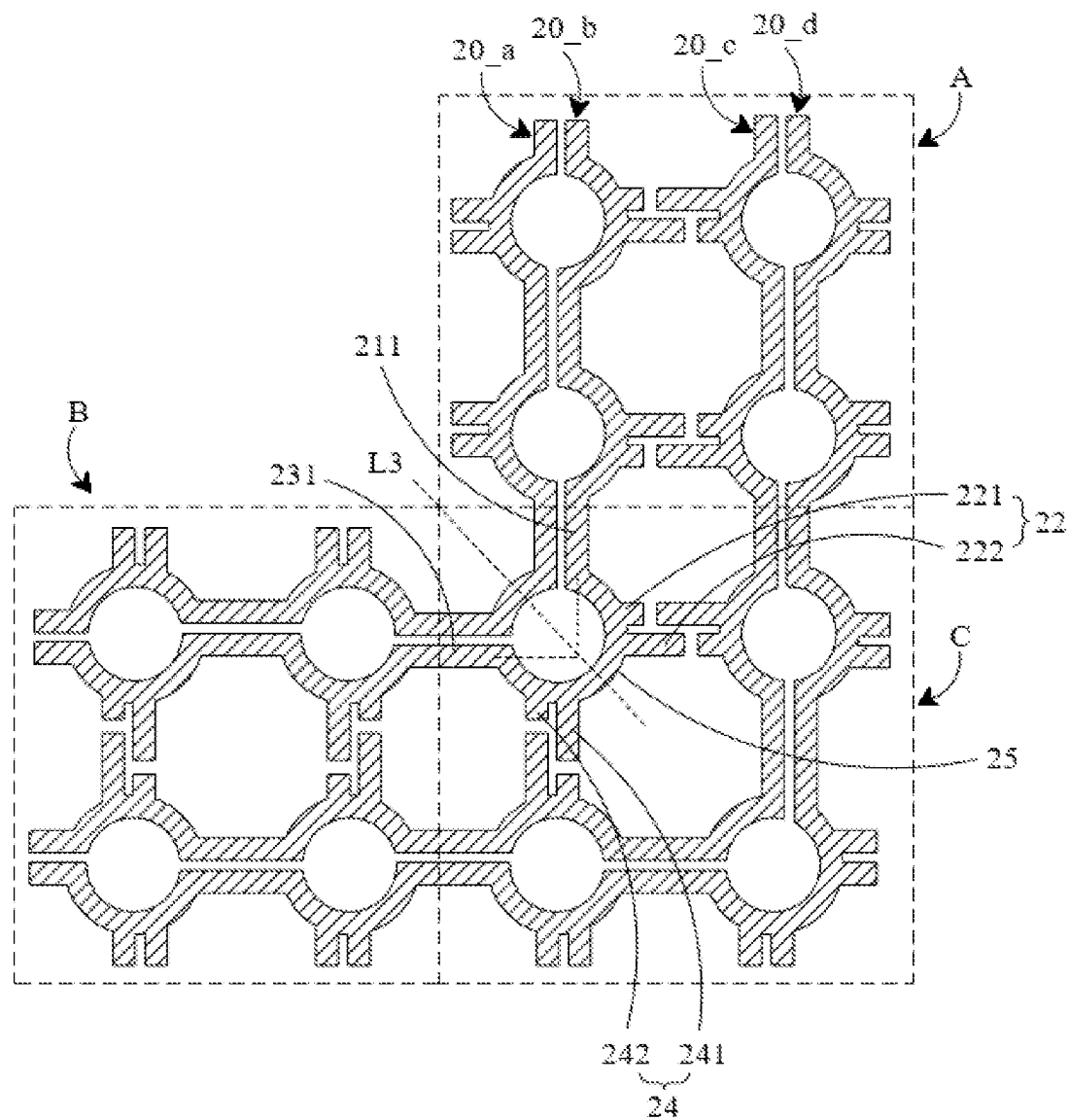
FIG. 7 is a schematic enlarged diagram of a site C according to an embodiment of the present disclosure.

As shown in FIG. 7, FIG. 7 is a schematic enlarged diagram of a site C according to an embodiment of the present disclosure. The site C is a corner of a connection between the touch signal lines extending along the second direction Y at the site A and the touch signal lines extending along the first direction X at the site B. The touch signal lines 20 also include third connecting parts 25, the third connecting parts 25 are curved, and two ends of each third connecting part 25 are respectively connected to the first trunk 211 and the second trunk 231, thereby connecting the touch signal lines extending along the second direction Y at the site A and the touch signal lines extending along the first direction X at the site B.

The touch signal lines 20_a, 20_b, and 20_c at the site C are taken as an example. The third connecting part 25 of the touch signal line 20_a and the third connecting part 25 of the touch signal line 20_b are enclosed to form a grid, and one of the sub-pixels 30 may be disposed in the grid. The third connecting part 25 of the touch signal line 20_b is further connected with a first extending part 22 and a second extending part 24, and the first extending part 22 and the second extending part 24 extend toward the adjacent touch signal line 20_c, respectively. The first extending part 22 and the second extending part 24 are not set on the third connecting parts 25 of the touch signal lines 20_a and 20_c adjacent to the touch signal line 20_b. They are only used to connect the first trunks 211 and the second trunks 231 corresponding thereto, and enclosed with corresponding third connecting parts 25 on the adjacent touch signal lines to form grids that accommodate the sub-pixels 30, thereby ensuring the touch signal lines extending along the second direction Y at the site A to be connected to the touch signal lines extending along the first direction X at the site B.

In the touch signal line 20_b, the angle bisecting line of the included angle formed by the extending line of the first trunk 211 and the extending line of the second trunk 231 is L3. The first extending part 22 and the second extending part 24 both connected to the third connecting part 25 are symmetrical about the angle bisecting line L3, thereby ensuring the touch signal lines extending along the second direction Y at the site A to be connected to the touch signal lines extending along the first direction X at the site B. Further, a part of the touch signal line 20_b at the site C may be symmetrical about the angle bisecting line L3, and at least a part of the touch signal line 20_b at the site A and at least a part of the touch signal line 20_b at the site B may also be symmetrical about the angle bisecting line L3. The touch signal lines 20_a, 20_c, and 20_d may also be symmetrical about the angle bisecting line L3.

It should be noted that a symmetrical structure of the touch signal line 20_b at the site C is taken as an example for description. Other touch signal lines may also be symmetrical about intersection corners of extending along the first direction X and the second direction Y. A specific structure thereof may refer to the touch signal lines 20_a, 20_b, 20_c, and 20_d in FIG. 7, and is not repeated herein.

Figure 8:
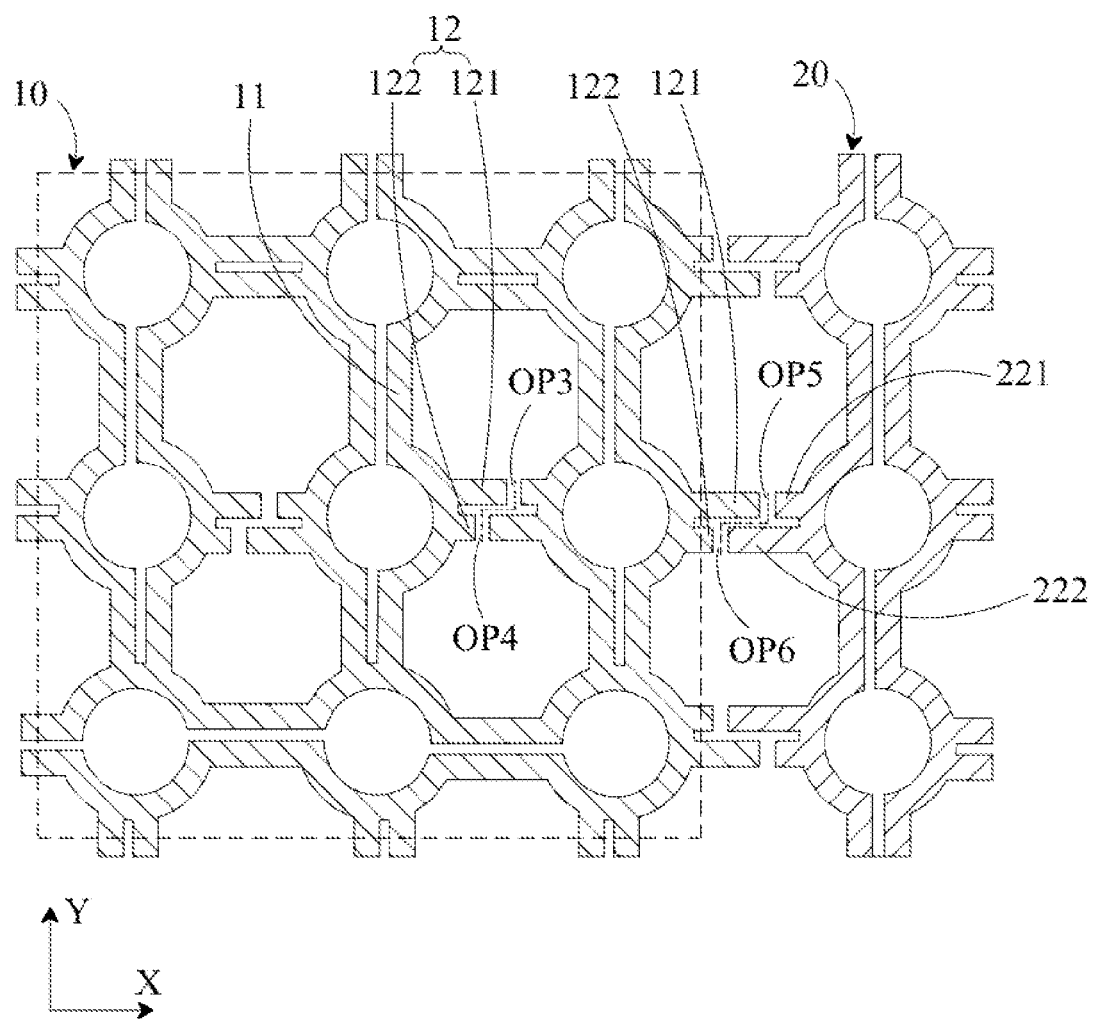
FIG. 8 is a schematic structural diagram of a touch electrode according to an embodiment of the present disclosure.

Further, as shown in FIG. 8, FIG. 8 is a schematic structural diagram of a touch electrode according to an embodiment of the present disclosure. Each of the touch electrodes 10 includes a plurality of touch main parts 11 extending along the second direction Y and disposed on the side of the sub-pixels and a plurality of touch extending parts 12 extending from the touch main parts 11 along the first direction X and spaced apart from each other, and the touch main parts 11 are electrically connected to each other by metal electrodes between adjacent touch main parts 11. It should be noted that in FIG. 8, only the structures of the touch main parts 11 and the touch extending parts 12 of the touch electrodes are illustrated, and a number and structure of the touch main parts 11 and the touch extending parts 12 of the touch electrodes are not limited.

Each touch extending part 12 includes a first control extending segment 121 and a second control extending segment 122, and the first control extending segment 121 and the second control extending segment 122 have different lengths.

A touch main part 11 and a touch extending part 12 located in a middle area of the touch electrode 10 are taken as an example. In a same touch extending part 12 disposed on the touch main part 11, a first control extending segment 121 and a corresponding first control extending segment 121 on an adjacent touch main part 11 are arranged side by side and spaced apart from each other to form a third opening OP3. A second control extending segment 122 and a corresponding second control extending segment 122 on the adjacent touch main part 11 are arranged side by side and spaced apart from each other to form a fourth opening OP4. The third opening OP3 and the fourth opening OP4 are staggered from each other.

The touch signal lines 20 may extend to the bonding area BA via either side of the touch electrodes 10. A touch main part 11 and a touch extending part 12 located at an edge of the touch electrode 10 and adjacent to the touch signal lines 20 are taken as an example. In the same touch extending part 12 disposed on the touch main part 11, the first control extending segment 121 and the corresponding first extending segment 221 on an adjacent one of the touch signal lines 20 may be arranged side by side and spaced apart from each other to form a fifth opening OP5, the second control extending segment 122 and the corresponding second extending segment 222 on the adjacent one of the touch signal lines 20 may be arranged side by side and spaced apart from each other to form a sixth opening OP6, and the fifth opening OP5 is staggered from the sixth opening OP6.

The light can be prevented from concentrating on the fifth opening OP5 and the sixth opening OP6 by staggering the fifth opening OP5 from the sixth opening OP6, thereby reducing a brightness difference between an edge area of the touch electrodes 10 adjacent to the touch signal lines 20 and other areas.

The touch control layer further includes a plurality of virtual lines 40. The virtual lines 40 may be disposed in other areas in the display area AA except the touch electrodes 10 and the touch signal lines 20, and are insulated from the touch electrodes 10 and the touch signal lines 20. The virtual lines 40 may not receive any electrical signal, so the virtual lines 40 may be used to fill the areas where the touch electrodes 10 and the touch signal lines 20 are not disposed, thereby reducing the brightness difference between the areas provided with the touch electrodes 10 and the touch signal lines 20 and other areas.

Structures of the virtual lines 40 and the touch signal lines 20 are substantially the same, and the virtual lines 40 may be disposed on the same layer and made of a same material as the touch signal lines 20. In the manufacturing process, a metal layer may be deposited and formed first, and then a same etching process is used to form the virtual lines 40 and the touch signal lines 20 at a same time.

The virtual lines 40 may be disposed surrounding the sub-pixels with adjacent virtual lines 40, touch signal lines 20, or touch electrodes 10 to allow areas which are not provided with the touch signal lines 20 and the touch electrodes 10 to have a similar coverage area of metal layer as other areas, thereby reducing the brightness difference between the areas which are not provided with the touch signal lines 20 and the touch electrodes 10 and other areas.

Each of the virtual lines 40 includes a virtual-line main part 41 extending along the first direction X or the second direction Y and virtual-line extending parts 42 extending from the virtual-line main part 41 and spaced apart from each other. Each of the virtual-line extending parts 42 includes a first virtual-line extending segment 421 and a second virtual-line extending segment 422, and a length of the first virtual-line extending segment 421 is different from that of the second virtual-line extending segment 422.

Figure 9:
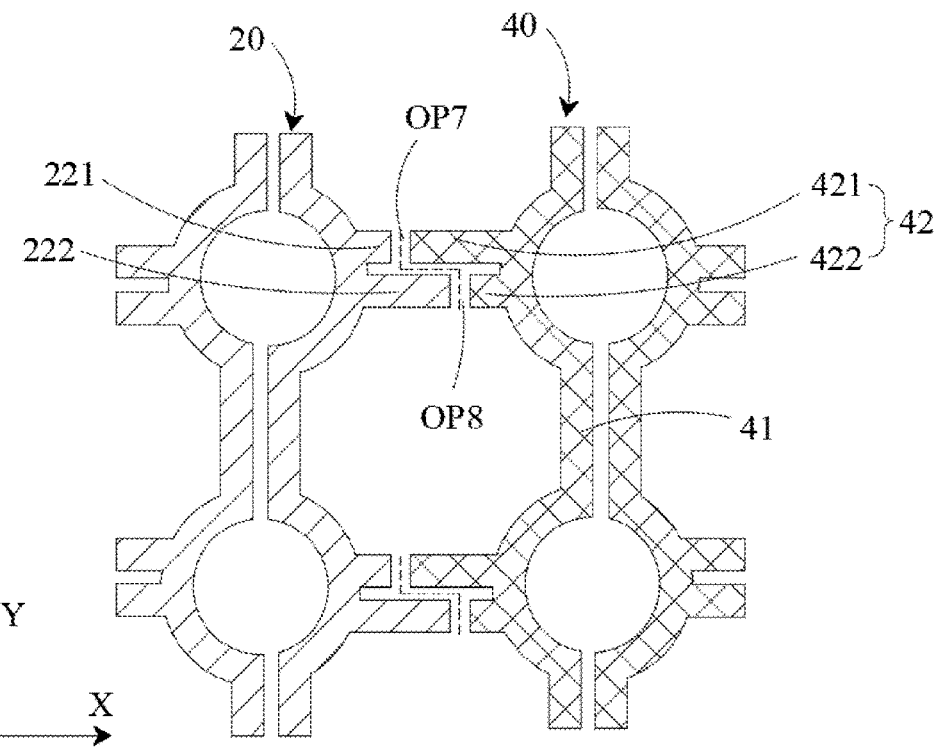
FIG. 9 is a schematic structural diagram of virtual lines at the site A according to an embodiment of the present disclosure.

As shown in FIG. 9, FIG. 9 is a schematic structural diagram of the virtual lines at the site A according to an embodiment of the present disclosure. The virtual lines 40 located at the site A in FIG. 1 and disposed on one side of the touch signal lines 20 are taken as an example. A touch signal line 20 extends along the second direction Y at the site A, and a virtual line 40 includes the virtual-line main part 41 extending along the second direction Y and the virtual-line extending parts 42 extending from the virtual-line main part 41 along the first direction X.

In one of the virtual-line extending parts 42 on the virtual line 40, the first virtual-line extending segment 421 and the corresponding first extending segment 221 on the touch signal line 20 are arranged side by side and spaced apart from each other to form a seventh opening OP7, and the second virtual-line extending segment 422 and the corresponding second extending segment 222 on the touch signal lines 20 are arranged side by side and spaced apart from each other to form an eighth opening OP8. The seventh opening OP7 and the eighth opening OP8 are staggered from each other.

Figure 10:
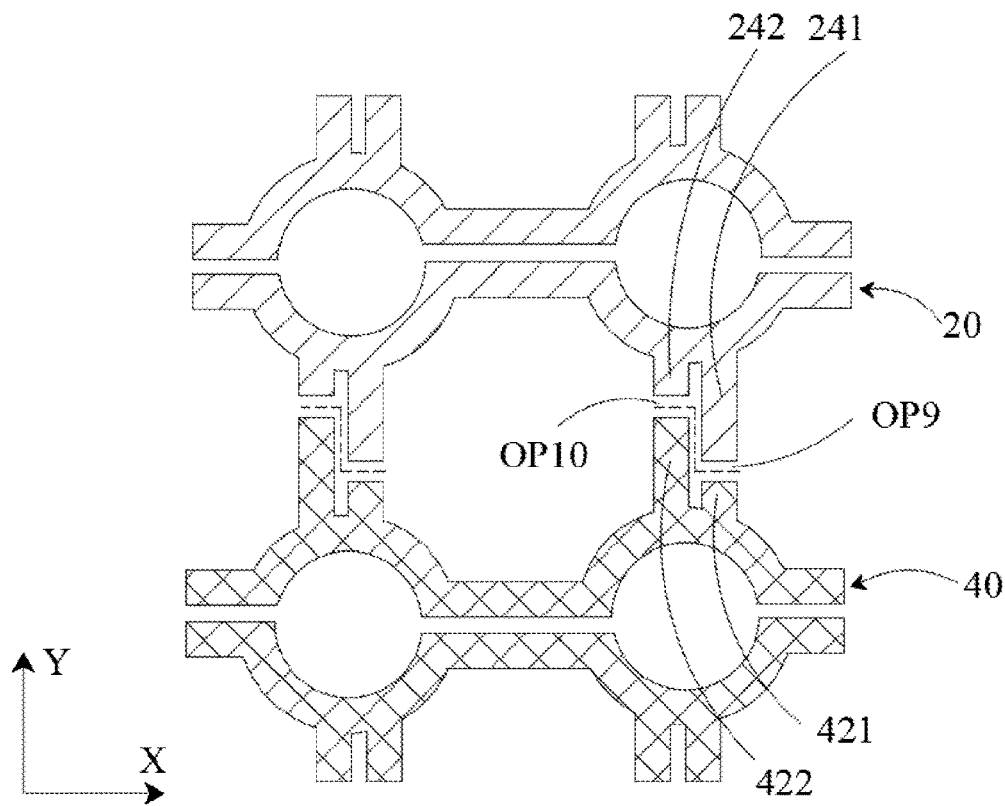
FIG. 10 is a schematic structural diagram of the virtual lines at the site B according to an embodiment of the present disclosure.

As shown in FIG. 10, FIG. 10 is a schematic structural diagram of the virtual lines at the site B according to an embodiment of the present disclosure. The virtual lines 40 located at the site B in FIG. 1 and disposed on the side of the touch signal lines 20 are taken as an example. The touch signal line 20 extends along the first direction X at the site B, and the virtual line 40 includes the virtual-line main part 41 extending along the first direction X and the virtual-line extending parts 42 extending from the virtual-line main part 41 along the second direction Y. In one of the virtual-line extending parts 42 on the virtual line 40, the first virtual-line extending segment 421 and the corresponding third extending segment 241 on the touch signal line 20 are arranged side by side and spaced apart from each other to form a ninth opening OP9, and the second virtual-line extending segment 422 and the corresponding fourth extending segment 242 on the touch signal lines 20 are arranged side by side and spaced apart from each other to form a tenth opening OP10. The ninth opening OP9 and the tenth opening OP10 are staggered from each other.

As shown in FIG. 1, the plurality of touch signal lines 20 extending along the second direction Y are disposed on one side of each column of the touch electrodes 10 or between two adjacent columns of the touch electrodes 10, and form a plurality of blind zones DA as shown by the dotted frame in FIG. 1. the plurality of virtual lines 40 may also be disposed in the blind zones DA. A structure and arrangement of the virtual lines 40 may refer to the structure and arrangement of the virtual lines 40 in FIG. 9 or FIG. 10, and is not repeated herein.

Figure 11:
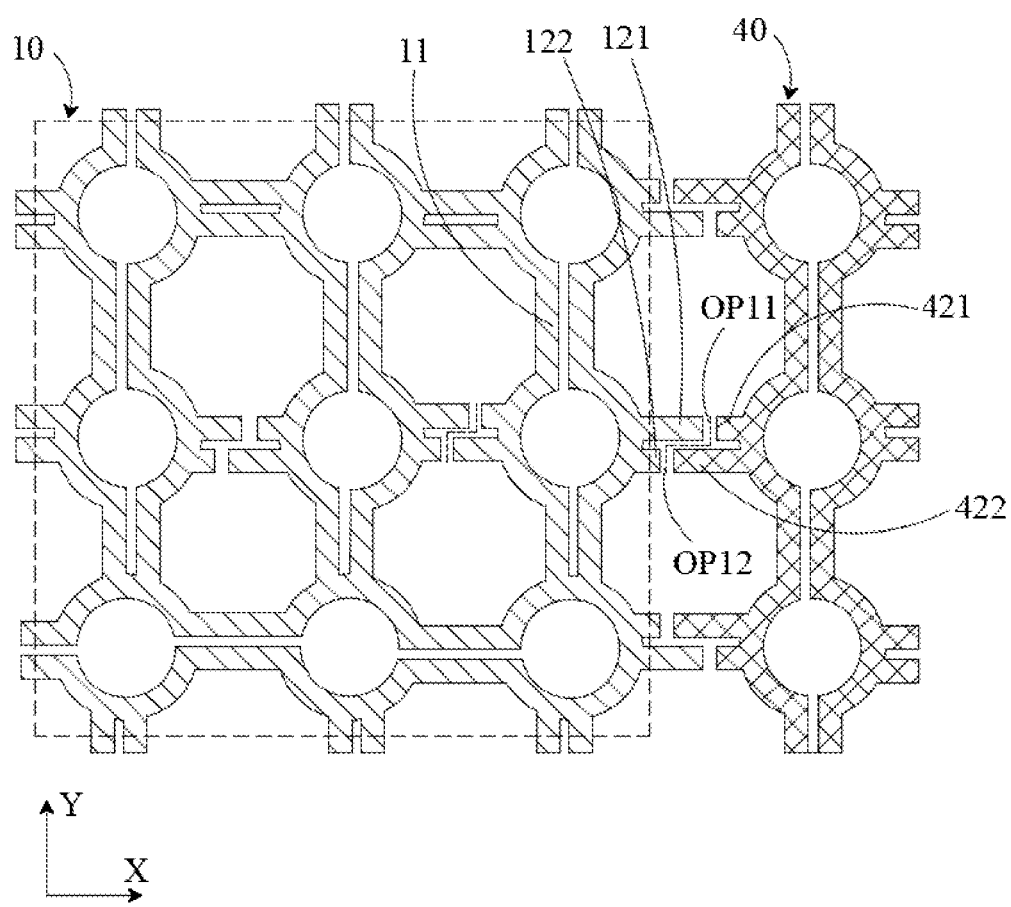
FIG. 11 is a schematic structural diagram of the virtual lines on one side of the touch electrode according to an embodiment of the present disclosure.

As shown in FIG. 11, FIG. 11 is a schematic structural diagram of the virtual lines on one side of the touch electrodes according to an embodiment of the present disclosure. The virtual lines 10 on the side of the touch electrodes 10 are taken as an example. The virtual line 40 may include the virtual-line main part 41 extending along the first direction X and the virtual-line extending parts 42 extending from the virtual-line main part 41 along the second direction Y. In one of the virtual-line extending parts 42 on the virtual line 40, the first virtual-line extending segment 421 and a corresponding first control extending segment 121 on the touch main part 11 are arranged side by side and spaced apart from each other to form an eleventh opening OP11, and the second virtual-line extending segment 422 and a corresponding second control extending segment 122 on the touch main part 11 are arranged side by side and spaced apart from each other to form a twelfth opening OP12. The eleventh opening OP11 and the twelfth opening OP12 are staggered from each other.

The areas not provided with the touch electrodes 10 and the touch signal lines 20 are taken as an example, the plurality of virtual lines 40 may be disposed in these areas, and the structure of the virtual lines 40 and the arrangement and position relationship of the virtual lines 40 may refer to the touch signal lines 20.

The first virtual-line extending segment 421 of the virtual-line extending parts 42 on one virtual line 40 and a corresponding first virtual-line extending segment 421 on an adjacent virtual line 40 may be arranged side by side and spaced apart from each other to form a thirteenth opening OP13, and the second virtual-line extending segment 422 and a corresponding second virtual-line extending segment 422 on the adjacent virtual line 40 may be arranged side by side and spaced apart from each other to form a fourteenth opening, and the thirteenth opening may be staggered from the fourteenth opening.

Based on the touch control display panel provided in the embodiments of the present disclosure, an embodiment of the present disclosure further provides a display device, which includes the touch control display panel provided in the above embodiments of the present disclosure. The display device may be a mobile terminal, such as a color electronic paper, a color e-book, a smart phone, etc., the display device may also be a wearable terminal, such as a smart watch, a smart wristband, etc., and the display device may also be a fixed terminal, such as a color electronic billboard, a color electronic poster, etc.

The beneficial effect of the embodiments of the present disclosure: the embodiments of the present disclosure provide the touch control display panel and the display device. The display device includes the touch control display panel, and the touch control display panel has the display area and the bonding area disposed on one side of the display area and includes: the display layer including the plurality of sub-pixels disposed in the display area; and the touch control layer including the plurality of touch electrodes disposed in the display area, wherein, the touch electrodes are arranged in rows along the first direction and arranged in columns along the second direction, and the first direction is different from the second direction; and the plurality of touch signal lines correspondingly connected to the touch electrodes by one-to-one and extending to the bonding area, wherein, a part of the sub-pixels are disposed between two adjacent touch signal lines; wherein, each of the touch signal lines includes the main part and the plurality of extending parts spaced apart from each other and extending toward an adjacent touch signal line, and one of the sub-pixels is disposed between two adjacent extending parts; and each of the extending parts includes two extending segments having different lengths, one of the two extending segments and a corresponding extending segment on the adjacent touch signal line are arranged side by side and spaced apart to form the first opening, and another one of the two extending segments and another corresponding extending segment on the adjacent touch signal line are arranged side by side and spaced apart to form the second opening. By staggering the first opening and the second opening, the patterning difference of the touch signal lines arranged respectively along the first direction and the second direction can be reduced, thereby reducing the difference of light transmittance between the touch signal lines arranged along the first direction and the second direction during display. Therefore, the uneven display of the touch control display panel can be improved.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A touch control display panel, having a display area and a bonding area disposed on one side of the display area and comprising:
a display layer comprising a plurality of sub-pixels disposed in the display area; and a touch control layer disposed on one side of the display layer and comprising:
a plurality of touch electrodes disposed in the display area, wherein the touch electrodes are arranged in rows along a first direction and arranged in columns along a second direction, and the first direction is different from the second direction; and
a plurality of touch signal lines correspondingly connected to the touch electrodes by one-to-one and extending to the bonding area;
wherein each of the touch signal lines comprises a main part disposed along the first direction or the second direction and positioned on one side of the sub-pixels and a plurality of extending parts spaced apart from each other and extending from the main part toward an adjacent touch signal line, and one of the sub-pixels is disposed between two adjacent extending parts of a same touch signal line; and
each of the extending parts comprises two extending segments having different lengths, one of the two extending segments and a corresponding extending segment on the adjacent touch signal line are arranged side by side and spaced apart to form a first opening, another one of the two extending segments and another corresponding extending segment on the adjacent touch signal line are arranged side by side and spaced apart to form a second opening, and the first opening and the second opening are staggered from each other;
wherein each of the touch electrodes comprises a plurality of touch main parts extending along the second direction and disposed on the side of the sub-pixels and a plurality of touch extending parts extending from the touch main parts and spaced apart from each other, and the touch main parts are electrically connected to each other; and
wherein each of the touch extending parts comprises two touch extending segments having different lengths, and one of the touch extending parts and a corresponding touch extending part on an adjacent touch main part are arranged side by side and spaced apart to form two staggered openings; or
wherein the one of the touch extending parts and a corresponding extending part on the adjacent touch signal line are arranged side by side and spaced apart to form the two staggered openings.

2. The touch control display panel according to claim 1, wherein in a same extending part, a length of each of the two extending segments is different from a length of respective corresponding extending segments on the adjacent touch signal line disposed on an opposite side of the sub-pixels.

3. The touch control display panel according to claim 2, wherein a length of the one of the two extending segments is greater than a length of the corresponding extending segment on the adjacent touch signal line disposed on the opposite side of the sub-pixels, and a length of the another one of the two extending segments is less than a length of the another corresponding extending segment on the adjacent touch signal line disposed on the opposite side of the sub-pixels.

4. The touch control display panel according to claim 1, wherein a length of the first opening is equal to a length of the second opening.

5. The touch control display panel according to claim 1, wherein widths of the two extending segments of each of the extending parts are equal, and a width of each of the two extending segments is equal to a width of respective corresponding extending segments on the adjacent touch signal line disposed on an opposite side of the sub-pixels.

6. The touch control display panel according to claim 1, wherein the main part of each of the touch signal lines comprises:
a first main part comprising a plurality of first trunks extending along the second direction and disposed on the side of the sub-pixels and a plurality of first connecting parts, wherein each of the first connecting parts is connected between two adjacent first trunks; and
a second main part electrically connected to the first main part, wherein the second main part comprises a plurality of second trunks extending along the first direction and disposed on the side of the sub-pixels and a plurality of second connecting parts, and each of the second connecting parts is connected between two adjacent second trunks;
wherein the extending parts comprise:
a plurality of first extending parts, wherein each of the first extending parts comprises a first extending segment and a second extending segment having different lengths and extending from a same first connecting part along the first direction; and
a plurality of second extending parts, wherein each of the second extending parts comprises a third extending segment and a fourth extending segment having different lengths and extending from a same second connecting part along the second direction.

7. The touch control display panel according to claim 6, wherein in each of the first extending parts on the same touch signal line, each first extending segment is disposed on a same side of each second extending segment; and
in each of the second extending parts on the same touch signal line, each third extending segment is disposed on a same side of each fourth extending segment.

8. The touch control display panel according to claim 6, wherein two adjacent first connecting parts and the first extending parts connected to the two adjacent first connecting parts are symmetrical about a perpendicular bisecting line of a first trunk connected between the two adjacent first connecting parts.

9. The touch control display panel according to claim 6, wherein two adjacent second connecting parts and the second extending parts connected to the two adjacent second connecting parts are symmetrical about a perpendicular bisecting line of a second trunk connected between the two adjacent second connecting parts.

10. The touch control display panel according to claim 6, wherein at least a part of the touch signal lines is symmetrical about an angle bisecting line of an included angle formed by an extending line of the first trunks and an extending line of the second trunks of the same touch signal line.

11. The touch control display panel according to claim 10, wherein at least the part of the touch signal lines each further comprises a third connecting part connected between one of the first trunks and one of the second trunks; and
the third connecting part is connected with a first extending part and a second extending part, and the first extending part and the second extending part are symmetrical about the angle bisecting line of the included angle formed by the extending line of the first trunks and the extending line of the second trunks.

12. The touch control display panel according to claim 1, wherein the touch control layer further comprises a plurality of virtual lines, the virtual lines are insulated from the touch electrodes and the touch signal lines, and the virtual lines comprise a plurality of virtual-line main parts extending along the first direction or the second direction and a plurality of virtual-line extending parts extending from the virtual-line main parts and spaced apart from each other; and wherein each of the virtual-line extending parts comprises two virtual-line extending segments having different lengths, and one of the virtual-line extending parts and a corresponding virtual-line extending part on an adjacent virtual line are arranged side by side and spaced apart to form two staggered openings; or the one of the virtual-line extending parts and the corresponding extending part on the adjacent touch signal line are arranged side by side and spaced apart to form the two staggered openings; or the one of the virtual-line extending parts and the corresponding touch extending part on the adjacent touch main part are arranged side by side and spaced apart to form the two staggered openings.

13. A display device, comprising a case and a touch control display panel installed on the case, wherein the touch control display panel has a display area and a bonding area disposed on one side of the display area and comprises:

a display layer comprising a plurality of sub-pixels disposed in the display area; and a touch control layer disposed on one side of the display layer and comprising:

a plurality of touch electrodes disposed in the display area, wherein the touch electrodes are arranged in rows along a first direction and arranged in columns along a second direction, and the first direction is different from the second direction; and a plurality of touch signal lines correspondingly connected to the touch electrodes by one-to-one and extending to the bonding area;

wherein each of the touch signal lines comprises a main part disposed along the first direction or the second direction and positioned on one side of the sub-pixels and a plurality of extending parts spaced apart from each other and extending from the main part toward an adjacent touch signal line, and one of the sub-pixels is disposed between two adjacent extending parts of a same touch signal line; and each of the extending parts comprises two extending segments having different lengths, one of the two extending segments and a corresponding extending segment on the adjacent touch signal line are arranged side by side and spaced apart to form a first opening, another one of the two extending segments and another corresponding extending segment on the adjacent touch signal line are arranged side by side and spaced apart to form a second opening, and the first opening and the second opening are staggered from each other;

wherein each of the touch electrodes comprises a plurality of touch main parts extending along the second direction and disposed on the side of the sub-pixels and a plurality of touch extending parts extending from the touch main parts and spaced apart from each other, and the touch main parts are electrically connected to each other; and wherein each of the touch extending parts comprises two touch extending segments having different lengths, and one of the touch extending parts and a corresponding touch extending part on an adjacent touch main part are arranged side by side and spaced apart to form two staggered openings; or wherein the one of the touch extending parts and a corresponding extending part on the adjacent touch signal line are arranged side by side and spaced apart to form the two staggered openings.

14. The display device according to claim 13, wherein in a same extending part, a length of each of the two extending segments is different from a length of respective corresponding extending segments on the adjacent touch signal line disposed on an opposite side of the sub-pixels.

15. The display device according to claim 14, wherein a length of the one of the two extending segments is greater than a length of the corresponding extending segment on the adjacent touch signal line disposed on the opposite side of the sub-pixels, and a length of the another one of the two extending segments is less than a length of the another corresponding extending segment on the adjacent touch signal line disposed on the opposite side of the sub-pixels.

16. The display device according to claim 13, wherein a length of the first opening is equal to a length of the second opening.

17. The display device according to claim 13, wherein widths of the two extending segments of each of the extending parts are equal, and a width of each of the two extending segments is equal to a width of respective corresponding extending segments on the adjacent touch signal line disposed on an opposite side of the sub-pixels.

18. The display device according to claim 13, wherein the main part of each of the touch signal lines comprises:

a first main part comprising a plurality of first trunks extending along the second direction and disposed on the side of the sub-pixels and a plurality of first connecting parts, wherein each of the first connecting parts is connected between two adjacent first trunks; and a second main part electrically connected to the first main part, wherein the second main part comprises a plurality of second trunks extending along the first direction and disposed on the side of the sub-pixels and a plurality of second connecting parts, and each of the second connecting parts is connected between two adjacent second trunks;

wherein the extending parts comprise:

a plurality of first extending parts, wherein each of the first extending parts comprises a first extending segment and a second extending segment having different lengths and extending from a same first connecting part along the first direction; and a plurality of second extending parts, wherein each of the second extending parts comprises a third extending segment and a fourth extending segment having different lengths and extending from a same second connecting part along the second direction.

19. The display device according to claim 18, wherein in each of the first extending parts on the same touch signal line, each first extending segment is disposed on a same side of each second extending segment; and in each of the second extending parts on the same touch signal line, each third extending segment is disposed on a same side of each fourth extending segment.

20. A touch control display panel, having a display area and a bonding area disposed on one side of the display area and comprising:

a display layer comprising a plurality of sub-pixels disposed in the display area; and a touch control layer disposed on one side of the display layer and comprising:

a plurality of touch electrodes disposed in the display area, wherein the touch electrodes are arranged in rows along a first direction and arranged in columns along a second direction, and the first direction is different from the second direction; and a plurality of touch signal lines correspondingly connected to the touch electrodes by one-to-one and extending to the bonding area;

wherein each of the touch signal lines comprises a main part disposed along the first direction or the second direction and positioned on one side of the sub-pixels and a plurality of extending parts spaced apart from each other and extending from the main part toward an adjacent touch signal line, and one of the sub-pixels is disposed between two adjacent extending parts of a same touch signal line; and each of the extending parts comprises two extending segments having different lengths, one of the two extending segments and a corresponding extending segment on the adjacent touch signal line are arranged side by side and spaced apart to form a first opening, another one of the two extending segments and another corresponding extending segment on the adjacent touch signal line are arranged side by side and spaced apart to form a second opening, and the first opening and the second opening are staggered from each other;

wherein the main part of each of the touch signal lines comprises:

a first main part comprising a plurality of first trunks extending along the second direction and disposed on the side of the sub-pixels and a plurality of first connecting parts, wherein each of the first connecting parts is connected between two adjacent first trunks; and a second main part electrically connected to the first main part, wherein the second main part comprises a plurality of second trunks extending along the first direction and disposed on the side of the sub-pixels and a plurality of second connecting parts, and each of the second connecting parts is connected between two adjacent second trunks;

wherein the extending parts comprise:

a plurality of first extending parts, wherein each of the first extending parts comprises a first extending segment and a second extending segment having different lengths and extending from a same first connecting part along the first direction; and a plurality of second extending parts, wherein each of the second extending parts comprises a third extending segment and a fourth extending segment having different lengths and extending from a same second connecting part along the second direction.

* * * * *